United States Patent
Brooks et al.

(10) Patent No.: US 10,655,276 B2
(45) Date of Patent: May 19, 2020

(54) METHOD FOR PRODUCING OR MACHINING A ROLLER, ROLLER AND FUNCTIONAL LAYER OF A ROLLER

(71) Applicant: VOITH PATENT GMBH, Heidenheim (DE)

(72) Inventors: Wesley Brooks, St. Helens (GB); Robert Eberhardt, Ellwangen (DE); Siegfried Graser, Niederstotzingen (DE); Franz Grohmann, Kueb/Payerbach (AT); Ting Liu, Hannover (DE); Ralf Moser, Sontheim (DE); Stefan Probst-Schendzielorz, Langenau (DE); Matthias Schmitt, Munich (DE); Michael Wokurek, Vienna (AT)

(73) Assignee: Voith Patent GmbH, Heidenheim (DE)

( * ) Notice: Subject to any disclaimer, the term of this patent is extended or adjusted under 35 U.S.C. 154(b) by 345 days.

(21) Appl. No.: 15/500,176

(22) PCT Filed: Jul. 17, 2015

(86) PCT No.: PCT/EP2015/066408
§ 371 (c)(1),
(2) Date: Jan. 30, 2017

(87) PCT Pub. No.: WO2016/016020
PCT Pub. Date: Feb. 4, 2016

(65) Prior Publication Data
US 2017/0247838 A1    Aug. 31, 2017

(30) Foreign Application Priority Data

Jul. 28, 2014 (DE) .......... 10 2014 214 734

(51) Int. Cl.
*D21G 1/02* (2006.01)
*D21F 3/08* (2006.01)
(Continued)

(52) U.S. Cl.
CPC .................. *D21G 1/02* (2013.01); *B05D 1/18* (2013.01); *D21F 3/08* (2013.01); *B22F 3/1055* (2013.01); *Y10T 29/49544* (2015.01)

(58) Field of Classification Search
CPC ......... Y10T 29/49544; Y10T 29/49545; Y10T 29/4956; Y10T 29/49563; Y10T 29/49565;
(Continued)

(56) References Cited

U.S. PATENT DOCUMENTS

| 4,789,565 A |   | 12/1988 | Kon et al. |
| 5,219,712 A | * | 6/1993 | Evans ................. B29C 35/08 257/E21.502 |

(Continued)

FOREIGN PATENT DOCUMENTS

| DE | 102010001940 A1 | 8/2011 |
| DE | 202012012489 U1 | 2/2013 |

(Continued)

*Primary Examiner* — Jason L Vaughan
(74) *Attorney, Agent, or Firm* — Laurence A. Greenberg; Werner H. Stemer; Ralph E. Locher

(57) ABSTRACT

A method produces or machines a roller which is suitable to be used in a machine for producing or processing a fibrous web. The roller contains a roller core and at least one functional layer. The method is characterized in that the method includes the application of a functional layer. The application of the functional layer is performed by applying a coating substrate to the surface of a roller core. The application takes place simultaneously over at least half the roller width, preferably over 75% of the roller width, particularly preferably over the entire roller width. The entire (Continued)

applied coating substrate or parts thereof are hardened, forming a solidified structure.

15 Claims, 2 Drawing Sheets

(51) Int. Cl.
  *B05D 1/18* (2006.01)
  *B22F 3/105* (2006.01)
(58) Field of Classification Search
  CPC .......... B05D 1/007; B05D 3/06; B05D 3/067; B05D 3/061; B22F 3/1055; B22F 3/1115; B22F 3/1121; B22F 3/1137; D21G 1/02; D21G 1/0246; D21G 1/026; D21G 1/0266; D21G 1/0273; D21G 1/028
  USPC .......................................................... 427/508
  See application file for complete search history.

(56) References Cited

U.S. PATENT DOCUMENTS

| | | | | |
|---|---|---|---|---|
| 5,640,667 | A * | 6/1997 | Freitag | B22F 3/1055 419/31 |
| 5,817,374 | A | 10/1998 | Detig et al. | |
| 5,851,598 | A * | 12/1998 | Gallant | D21F 1/40 427/515 |
| 7,008,513 | B2 * | 3/2006 | Davenport | B05D 1/327 162/361 |
| 8,182,882 | B2 * | 5/2012 | Johnson | G03F 7/032 427/487 |
| 8,518,479 | B2 * | 8/2013 | Gao | B81C 1/00071 118/641 |
| 8,663,748 | B2 * | 3/2014 | Akama | G03G 15/0233 347/101 |
| 2004/0127122 | A1 * | 7/2004 | Davenport | B05D 1/327 442/64 |
| 2006/0162163 | A1 * | 7/2006 | Watanabe | B29C 63/14 29/895.211 |
| 2006/0172072 | A1 * | 8/2006 | Paasonen | B05D 7/58 427/372.2 |
| 2008/0300703 | A1 * | 12/2008 | Widmer | H04R 25/652 700/97 |
| 2009/0017219 | A1 * | 1/2009 | Paasche | B22F 3/003 427/466 |
| 2009/0206522 | A1 * | 8/2009 | Hein | B22F 3/1055 264/497 |
| 2013/0136868 | A1 * | 5/2013 | Bruck | B05D 3/06 427/554 |
| 2013/0140278 | A1 * | 6/2013 | Bruck | B23K 25/005 219/73.11 |
| 2013/0142965 | A1 * | 6/2013 | Bruck | C23C 24/106 427/597 |
| 2015/0051318 | A1 | 2/2015 | Grohmann et al. | |
| 2015/0343564 | A1 * | 12/2015 | Bruck | B22F 3/1055 427/470 |

FOREIGN PATENT DOCUMENTS

| | | |
|---|---|---|
| DE | 102011082849 A1 | 3/2013 |
| DE | 102012205227 B3 | 4/2013 |
| DE | 102011088685 A1 | 6/2013 |
| DE | 102012207398 A1 | 9/2013 |
| EP | 0269262 A2 | 6/1988 |
| GB | 1565801 A | 4/1980 |

* cited by examiner

METHOD FOR PRODUCING OR MACHINING A ROLLER, ROLLER AND FUNCTIONAL LAYER OF A ROLLER

BACKGROUND OF THE INVENTION

Field of the Invention

The invention relates to a method for producing or machining a roll which is suitable to be used in a machine for producing or processing a fibrous web, and to a roll which is suitable for use in a machine for producing or processing a fibrous web and to a functional layer of a roll.

In many industrial plants, such as machines for paper production or processing, a large number of rolls are used for an extremely wide range of purposes. These rolls usually have a roll core, to which one or more functional layers are applied. These functional layers, for example in a paper machine, come into contact with the paper web and therefore, depending on the area of use, must meet specific requirements on their physical properties or their surface properties. In many cases, these functional layers also wear considerably faster than the roll body, and therefore have to be renewed or replaced regularly during the service life of the roll.

From the prior art, such as U.S. Pat. No. 7,008,513 B2, various methods are known for this purpose, in which the coating material is applied uniformly to the surface of the roll blank to be coated.

In many applications, however, it is technically necessary that the functional layer does not constitute a uniform smooth surface but must contain a structure of channels, grooves or bores. In order to achieve this, according to the current prior art the roll is subjected to a second process step following the coating. Here, the functional layer is provided with the necessary structure by techniques such as milling or drilling.

However, this prior art is problematic from two points of view. Firstly, two process steps are needed in order to apply the functional layer to the roll. This leads to the processing time being prolonged and is additionally associated with higher costs.

Furthermore, the type of structures which are introduced into the functional layer is highly restricted, since it is possible to use only structures which can be removed from the functional layer from outside by means of a drill or another tool. From a technical point of view, however, it would be very desirable also to use hidden structures, such as channels, which extend over wide regions in the interior of the functional layer.

SUMMARY OF THE INVENTION

The object of the present invention is therefore to specify a method in which the functional layer can be produced with virtually any desired structures in a single production step, and also a corresponding functional layer of a roll and a corresponding roll.

In the sense of the present invention, structure is understood to mean a solidified and in particular predefined structure. Predefined means that this structure for the most part does not arise randomly as a result of the production process per se, for example since a random surface structure of the finished functional layer is given by the subsequent hardening of the functional layer. Structures in the sense of the invention preferably means three-dimensional functional structures which are introduced into the functional layer or are formed by the latter. These can be, for example, grooves or holes, as can be produced in accordance with the prior art only in a re-machining step by means of drilling or milling. However, channels are also conceivable. These structures then have a function: they or their boundary walls can be used, for example, to conduct (away) a medium.

Expressed in another way, these predefined structures are built up in a primary shaping manner—that is to say additively—at the same time as the functional layer, in particular layer by layer. In other words, the finished functional layer simultaneously delimits these structures or forms said structures—partly or completely—without any additional re-machining step being needed, for example subtractive machining, for example by material-removing machining such as drilling or milling. It would also be possible to say that, at the same time as the last step of the hardening of the coating substrate or the entire functional layer, the predefined structure is finally formed completely by the last-named.

A completed functional layer means a finished functional layer that is nominated for the intended purpose, which already contains the nominated structures and needs substantially no further re-machining step to produce these structures.

The method according to the invention is a method for producing or machining a roll which is suitable to be used in a machine for producing or processing a fibrous web. Machining of a roll, according to the invention, can be understood to mean, for example, the renewal of one or more functional layers in an existing roll. The roll comprises a roll core and at least one functional layer. The roll can, however, also comprise multiple functional layers with the same or different objects. In addition, provision can be made that—viewed outward in the radial direction—a connecting layer is provided between the roll core and an innermost functional layer and/or between two functional layers. This can be, for example, an adhesive layer.

The method comprises the application of at least one functional layer to a roll blank.

The term roll blank here designates each intermediate stage during the production of the roll, to which at least one further functional layer is also applied.

The application of the functional layer in the method according to the invention has at least the following process steps:

a) applying the coating substrate to the surface of the roll blank, wherein the application takes place simultaneously over at least half the roll width, preferably over 75% of the roll width, particularly preferably over the entire roll width, b) hardening the entire applied coating substrate or parts thereof, forming a solidified structure.

Here, two aspects are to be emphasized in particular. Firstly, the wide application of the coating medium. In the methods according to the prior art, a coating medium is applied by using a nozzle or the like, the width of which amounts to a fraction of the roll. The surface of the roll is then covered by a movement of this nozzle and successive application of the coating medium. In the method according to the invention, the coating medium is applied simultaneously over the entire roll width or at least half the roll width.

Secondly, in step b) the possibility is provided of hardening the entire coating substrate or else only parts thereof to form a solidified structure. This permits high flexibility in the production process.

Advantageous embodiments are described in the subclaims.

Coating substrate designates a material which forms the sole or substantial constituent of the functional layer after it has experienced a change in its structure as a result of a hardening process step. In one advantageous embodiment of the method, the coating substrate comprises a powder or a liquid. In the case of a powder as coating substrate, hardening in the context of this application is understood to mean conversion into a solid, largely homogeneous layer. As an example of such methods of hardening, sintering, specifically laser sintering, may be mentioned at this point.

A large number of materials are suitable as coating substrate. It is particularly advantageous if the coating substrate comprises plastic and/or metal. In an advantageous embodiment of the method, the plastic used can be, for example, a polyurethane (PU), polyamide (PA), polyether ether ketone (PEEK), rubber-like elastomers. In addition, specific combined materials such as aluminum-filled PA, carbon-filled PA or glass-fiber-filled PA can be used. In addition, an epoxy resin, for example, is also well suited as a liquid coating substrate.

The application of the coating substrate in a particularly advantageous embodiment can be carried out by dipping the roll blank in a storage volume such as, for example, a trough or a tank which is filled with coating substrate. The roll blank is in this case preferably rotatably mounted about the roll axis. By means of rotating the roll blank, it is possible for the entire surface of the roll blank to gradually come into contact with the coating substrate.

In a preferred embodiment of the method, the coating substrate adheres to the roll blank by electrostatic attraction.

In a further advantageous embodiment, provision can be made for the coating substrate to be applied in one or more layers over one another, wherein the application of a following layer of coating substrate is carried out on the wholly or partly solidified structure of the previous layer. A functional layer can therefore be built up from multiple layers of coating substrate. As a result of the layer by layer build-up of the functional layer, it is thus also possible to change the property of the functional layer over its thickness, in that either the coating substrate is hardened differently in different layers or different coating substrates are used in all or some layers.

In an advantageous embodiment, the thickness of the applied layer of coating substrate can be adjusted by means of a doctor which, seen in the direction of rotation of the roll, is arranged after the application to the roll but before the hardening of the coating substrate. Excess coating substrate which adheres to the roll is removed by this doctor, and only one layer of defined thickness is hardened.

In a further inventive variant of the method, during the layer by layer build-up of the functional layer, regions of non-hardened coating substrate can be covered wholly or partly by regions of hardened coating substrate of the following layer.

In a quite particularly preferred embodiment, the inventive method has a further process step, in which coating substrate which was been hardened in process step b) is removed again. In this way, for example as early as during the application of the functional layer, preferably three-dimensional functional structures can be introduced into the functional layer. They can be, for example, grooves or holes, as can be produced in accordance with the prior art only in a re-machining step by means of drilling or milling, etc. In addition, in further advantageous embodiments of the invention, three-dimensioned functional structures can be produced which cannot be achieved with conventional methods, for example channels which extend over wide regions in the interior of the functional layer. This can be achieved, for example, by regions of non-hardened coating substrate, which are intended later to form the channels, being covered wholly or partly by a solidified structure of the following layer, and the non-hardened coating substrate then being removed. In an advantageous embodiment of the method, the process of hardening the coating substrate takes place wholly or partly by irradiation with light, preferably with laser light. When a powdery coating substrate is used, a quite particularly advantageous method is laser sintering, specifically selective laser sintering (SLS).

In order to harden the entire width of the roll surface, use can be made of one or more lasers, and these can, if appropriate, be applied in a manner traversing over the width of the roll.

In a preferred embodiment of the method, the control of the hardening can be carried out via a computer system. As a result, it is possible to control which regions of the coating substrate are to be hardened and which are not. In a particularly advantageous embodiment, the necessary control information is taken partly or wholly from a CAD system.

In a further preferred embodiment of the method, the thickness of the functional layer at the end of the production and machining is more than 6 mm, preferably more than 10 mm, particularly preferably between 10 mm and 20 mm.

A further, independent aspect of the invention is a roll which is suitable to be used in a machine for producing or processing a fibrous web, which has been produced or machined by means of a method according to the invention.

A further, independent aspect of the invention is the functional layer of a roll which is suitable for use in a machine for producing or processing a fibrous web, produced or machined by means of a method according to the invention.

BRIEF DESCRIPTION OF THE SEVERAL VIEWS OF THE DRAWING

The invention will be described in detail below, without restricting generality, by using the figures, in which.

DESCRIPTION OF THE INVENTION

Figure 1:
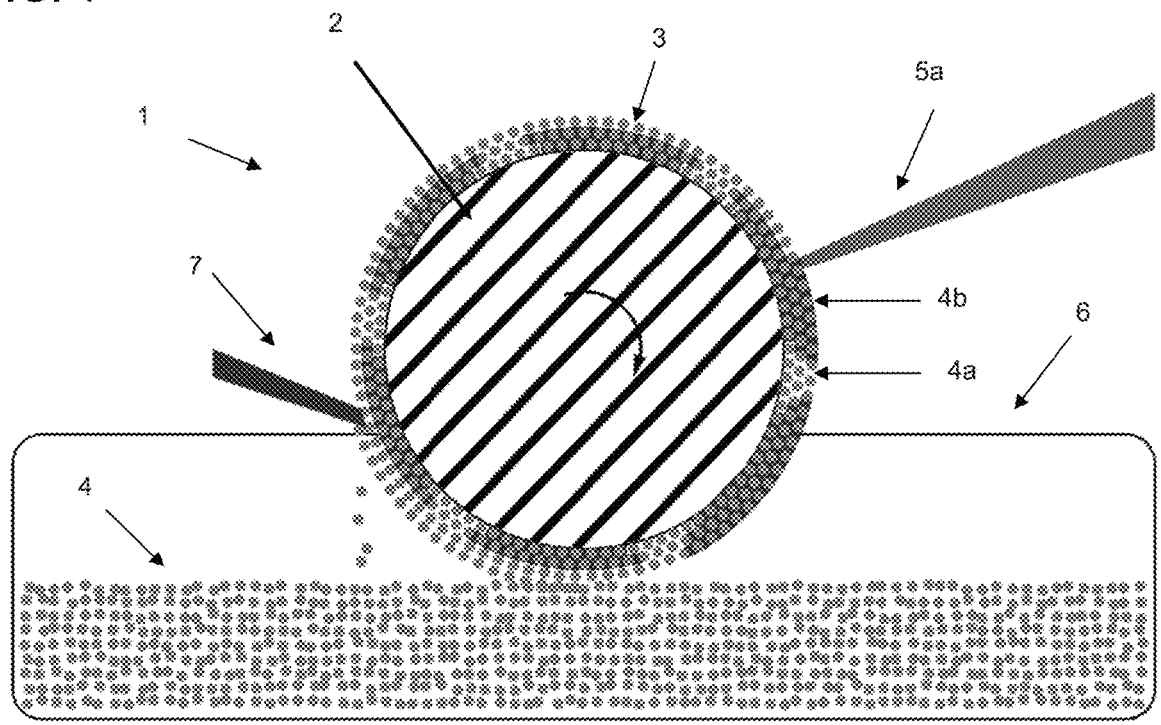
FIG. 1 shows a schematic section, not to scale, of a roll during the machining by means of a method according to the invention.

FIG. 1 shows a cross section of a roll 1, wherein the roll core 2 is provided with the functional layer 3. Here, the roll 1, which is rotatably mounted, dips with its entire width into a storage volume 6 which is filled with a coating substrate 4. The coating substrate in the example shown in FIG. 1 is a powder, preferably a metal powder or plastic powder. This coating substrate 4 adheres to the roll blank here as a result of electrostatic force. As a result of the immersion in the storage volume 6, a largely undefined quantity of coating substrate 4 adheres to the roll blank. Said substrate is transported forward in the direction of rotation of the roll 1. By means of a doctor 7, the excess of coating substrate 4 can be scraped off, and an exactly defined layer of coating substrate 4 can be conveyed onward. The excess of coating substrate 4 can preferably be led into the storage volume 6 again. This layer is transported onward in the direction of rotation of the roll and, after that, is hardened by means of a laser 5a. This is preferably done by means of the process of selective laser sintering. Here, selective means that it is not the whole of the coating substrate 4 that is sintered and therefore hardened. Instead, by means of computer control, virtually any desired pattern of hardened coating substrate 4a and non-hardened coating substrate 4b can be produced. In order to harden the entire width of the roll surface, use can be made of one or more lasers, and these can, if appropriate, be applied in a manner traversing over the width of the roll.

This process of the application and hardening of a layer of coating substrate 4 can in principle be repeated as often as desired until the desired thickness of the functional layer 3 is reached. The finished functional layer 3 is preferably thicker than 6 mm, particularly preferably thicker than 10 mm, quite particularly preferably between 10 mm and 20 mm thick. During the layer by layer application and hardening of the coating substrate 4, regions of non-hardened coating substrate 4a can be covered wholly or partly by regions of hardened coating substrate 4b of the following layer wholly or partly. The non-hardened coating substrate 4a, that is to say the powder here, is removed from the functional layer 3 in a further method step. As a result, cavities are produced in the functional layer. In terms of number and shape of these cavities, there is virtually full freedom in the method according to the invention. Even complicated patterns and, for example, channels which extend largely in the interior of the functional layer 3 can thus be implemented. The data for describing the three-dimensional functional structure of the cavities can be read into the computer system of the control, for example from a CAD system.

Figure 2:
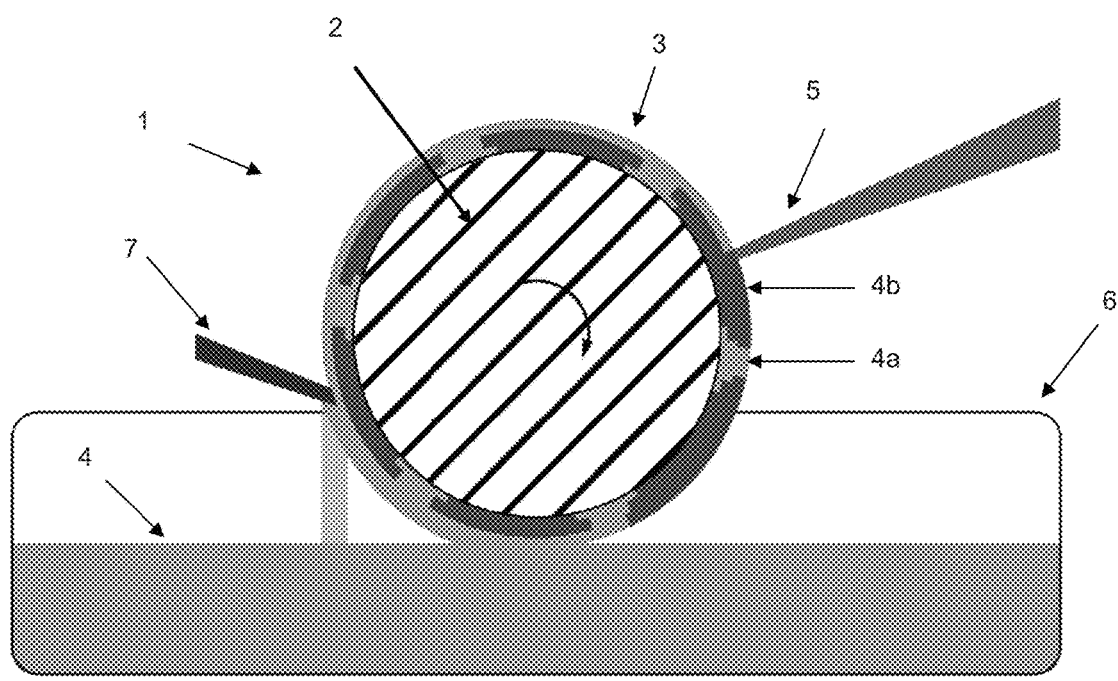
FIG. 2 shows a schematic section, not to scale, of a roll during the machining by means of a further method according to the invention.

FIG. 2 also shows a cross section of a roll 1, wherein the roll core 2 is provided with a functional layer 3. Here, too, the rotatably mounted roll 1 is dipped over its entire width in a storage volume 6 which is filled with coating substrate 4. In the method shown in FIG. 2, the coating substrate 4 consists of a liquid, preferably a liquid plastic. It can be imagined that the plastic is a polyurethane or rubber or another polymer. Otherwise, the method proceeds in principle in exactly the same way as already described in relation to FIG. 1. A doctor 7 scrapes off the excess liquid of the coating substrate 4, which is preferably led into the storage volume 6 again. The hardening of the layered substrate is again carried out by means of irradiation, for example with a laser 5. In this embodiment of the method also, once more multiple layers of coating substrate 4 applied over one another can result in a functional layer 3. In this embodiment of the method according to the invention, too, once more the non-hardened liquid coating substrate 4a is removed, by which means cavities are produced in the functional layer 3. Furthermore, of course, that stated in relation to FIG. 1 also applies with respect to the three-dimensional structure of the cavities.

Figure 3:
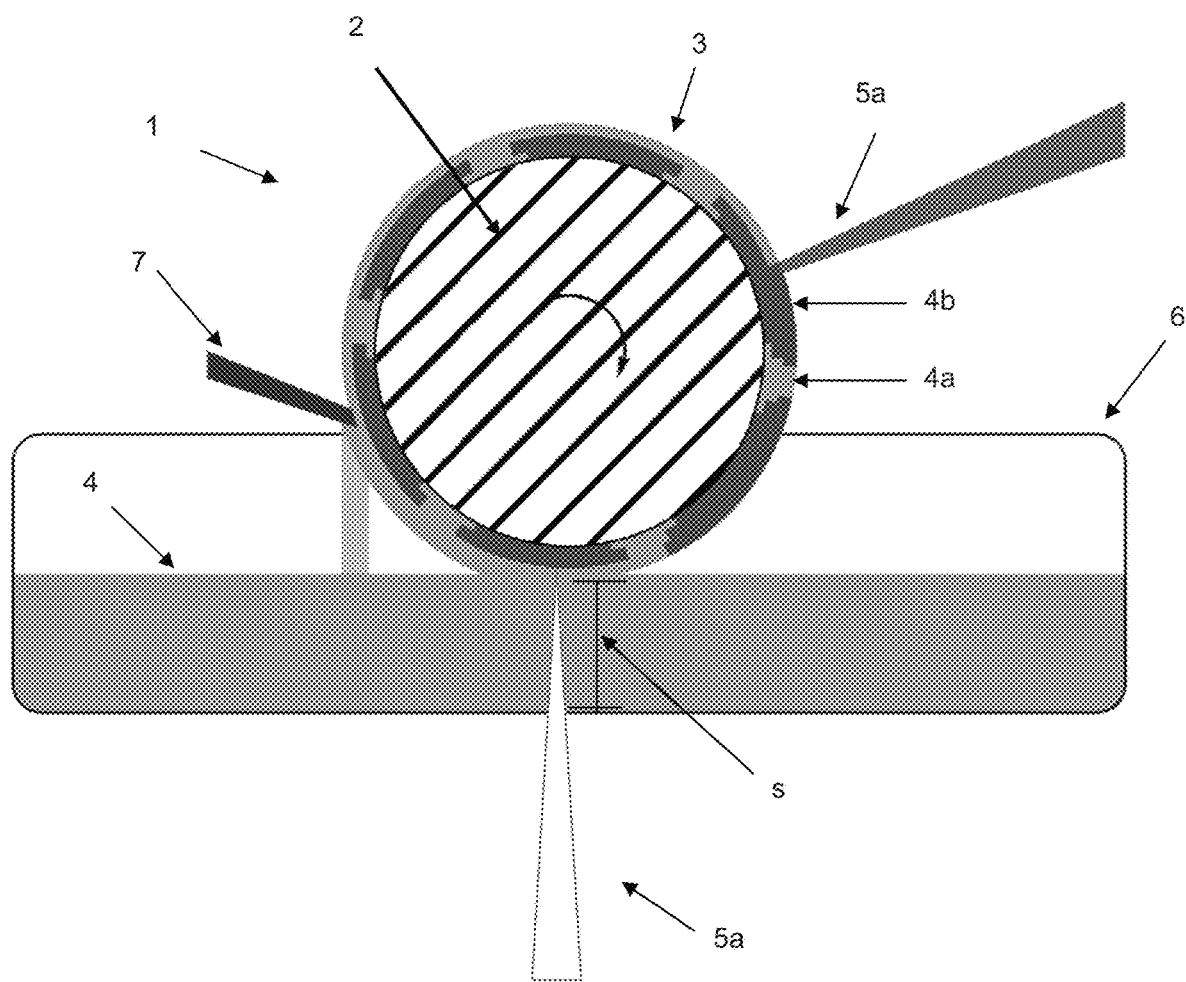
FIG. 3 shows a development of the subject matter on FIG. 3.

FIG. 3 shows a development of the subject matter of FIG. 2, so that that already stated in relation to FIG. 2 applies. The illustration is purely schematic here and therefore not to scale. As illustrated in FIG. 2, the storage volume 6 has a bottom and walls connected to the bottom to receive the coating substrate 4. Furthermore, the level of the coating substrate 4 illustrated in the figures, based on the bottom of the storage volume 6, can also be chosen to be greater, so that the roll 1 dips into the latter more deeply than shown.

In the present case, the device for hardening the coating substrate 4 is arranged in such a way that the irradiation, for example by means of laser, is carried out through the liquid coating substrate 4, in addition or as an alternative to the arrangement in FIG. 2. That means the beam path extends through the coating substrate 4. Accordingly, the coating substrate 4 can be formed in such a way that it permits such at least partial transmission through the same. The device illustrated for hardening the coating substrate 4, such as the laser radiation source, can be arranged outside, underneath or inside the storage volume 6. If two laser beams are provided, these can be generated by one and the same device.

Furthermore, the distance s between the bottom of the storage volume 6 and the radially outermost surface of the roll 1 can be chosen in such a way that it corresponds substantially to the thickness of a layer of coating substrate 4 to be applied—seen in the radial direction of the roll 1. Here, substantially means that more than exactly this thickness is possible as the distance s. The distance s can also be adjustable continuously, in particular capable of continuous tracking, and is preferably kept constant during the production method of the roll 1. For this purpose, the roll 1 can be displaceable relative to the storage volume along the drawing plane illustrated, in particular displaceable only translationally (apart from its direction of rotation about the actual axis). The distance s can also be the smallest distance between the aforementioned elements and preferably extends parallel or along a normal to the bottom of the storage volume 6.

The laser beam shining through the coating substrate 4 can also be focused such that it is incident in the coating substrate 4 in the region of the distance s, that is to say in the region of the thickness of the layer to be produced.

The invention claimed is:

1. A method for producing or processing a roller suitable to be used in a machine for producing or processing a fibrous web, the roller having a roller core, which comprises the steps of:
   applying at least one functional layer to the roller core, by the further steps of:
   applying a coating substrate to a surface of the roller core by applying a non-hardened coating substrate to the surface of the roller core, at least partially covering the non-hardened coating substrate with regions of a hardened coating substrate, and removing the non-hardened coating substrate located under the regions of the hardened coating substrate.

2. The method according to claim 1, which further comprises forming the coating substrate as one of a powder or a liquid.

3. The method according to claim 1, which further comprises forming the coating substrate to contain at least one of a plastic or a metal.

4. The method according to claim 1, which further comprises carrying out the application of the coating substrate by dipping the roller core in a storage volume which is filled with the coating substrate.

5. The method according to claim 4, wherein the coating substrate adheres to the roller core by electrostatic attraction.

6. The method according to claim 4, which further comprises rotatably mounting the roller core for carrying out the application of the coating substrate by dipping the roller core in the storage volume.

7. The method according to claim 1, which further comprises applying the coating substrate in layers over one another, wherein the application of a following layer of the coating substrate is carried out on a wholly or partly solidified structure of a previous layer.

8. The method according to claim 1, which further comprises adjusting a thickness of an applied layer of the coating substrate by means of a doctor blade which, seen in a direction of rotation of the roller, is disposed after the application of the coating substrate to the roller but before a device for hardening the coating substrate.

9. The method according to claim 1, wherein after removing the non-hardened coating substrate, the regions of hardened coating substrate form solidified structures in a form of three-dimensional functional structures.

10. The method according to claim 1, which further comprises carrying out the hardening of the coating substrate wholly or partly by irradiation with light.

11. The method according to claim 1, which further comprises controlling the hardening via a computer system.

12. The method according to claim 1, which further comprises forming the functional layer to have a thickness of more than 6 mm.

13. The method according to claim 1, which further comprises applying the coating substrate over an entire roller width of the roller core.

14. The method according to claim 1, which further comprises forming the functional layer to have a thickness between 10 mm and 20 mm.

15. A method for producing or processing a roller being suitable to be used in a machine for producing or processing a fibrous web, the roller having a roller core, which comprises the steps of:
  applying at least one functional layer to the roller core, by the further steps of:
  a) applying a layer of a coating substrate to a surface of the roller core using a first application method;
  b) hardening the coating substrate entirely or parts of the coating substrate applied, forming a solidified predefined structure;
  c) repeating steps a) and b), so that multiple layers are applied over one another, wherein an application of a following layer of the coating substrate is carried out to a wholly or partly solidified predefined structure of a previous layer, until the at least one functional layer is completed, and wherein the first application method is used to perform a plurality of repetitions of step a), wherein at least regions of the coating substrate are non-hardened after repeating steps a) and b); and
  d) removing the regions of the coating substrate that are non-hardened.

* * * * *